Jan. 14, 1930.  L. CAMPBELL  1,743,528
UNDERREAMER
Filed April 9, 1927  2 Sheets-Sheet 1
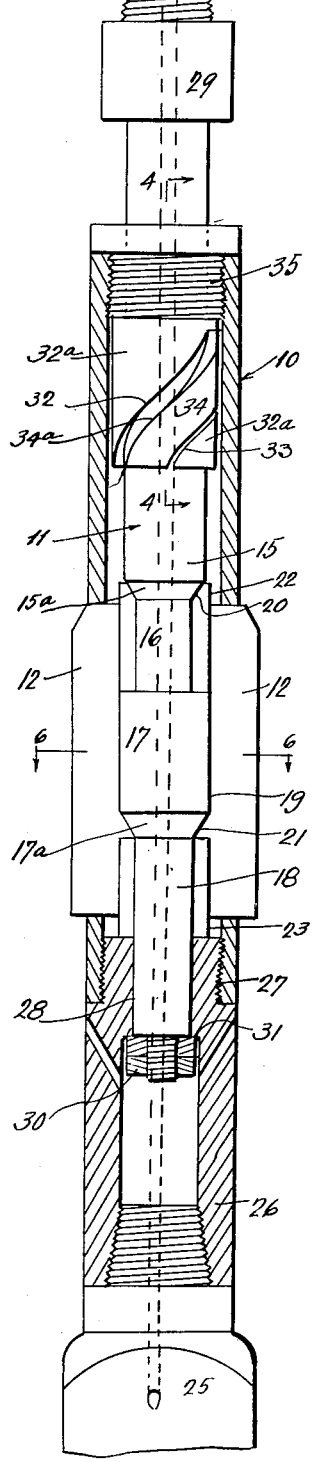
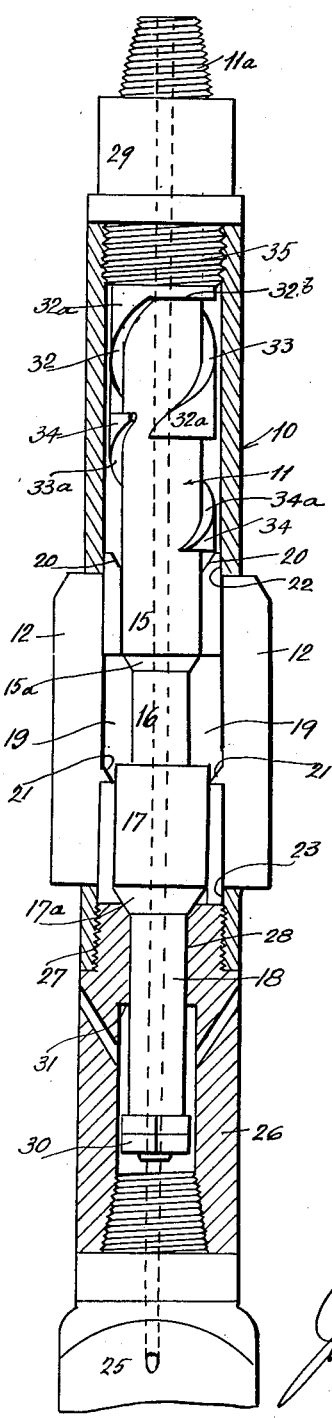
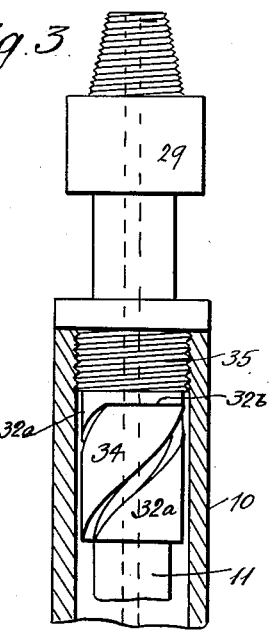
Inventor.
Lawrence Campbell.
Attorney.

Jan. 14, 1930. L. CAMPBELL 1,743,528
UNDERREAMER
Filed April 9, 1927 2 Sheets-Sheet 2

Inventor.
Lawrence Campbell.

Attorney.

Patented Jan. 14, 1930

1,743,528

UNITED STATES PATENT OFFICE

LAWRENCE CAMPBELL, OF KANSAS CITY, MISSOURI, ASSIGNOR TO JOHN GRANT, OF LOS ANGELES, CALIFORNIA

UNDERREAMER

Application filed April 9, 1927. Serial No. 182,520.

This invention has general relation to expansible boring or cutting tools, and more specifically to an expansible reamer for well drilling. The following detailed description will therefore, but without necessary limitation, deal with the invention in a form as designed particularly for reaming wells.

A major object of the invention is to provide a tool which does not depend upon a spring or springs for its actuation. Although spring actuated reamers are in use, and the spring operation has been found to be very satisfactory, yet operation by spring is not under all circumstances infallible, and this is particularly true in some styles of underreamers which are so constituted that they may easily become clogged with cuttings so that the spring fails to operate to expand the cutters.

In my invention, as applied specifically and illustratively to a rotary underreamer, I have provided means whereby relative rotation of two of the parts causes positive expansive actuation of the cutters. The forces thus applicable to expansion of the cutters are comparatively large and the cutters may thus be positively expanded under the most adverse conditions. All of this will be best understood from the following detailed description of a preferred and illustrative form of rotary underreamer, reference for this purpose being had to the accompanying drawings, in which:

Fig. 1 is a central vertical section, with parts in elevation, of such an underreamer, shown in its contracted position;

Fig. 2 is a similar view showing the expanded position;

Fig. 3 is a fragmentary elevation of certain parts, this view being taken in the aspect which would appear from the right-hand side of Fig. 1;

Figure 4:
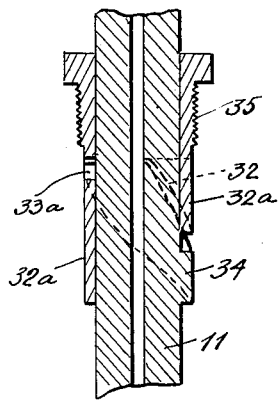
Fig. 4 is a detailed longitudinal section on line 4—4 of Fig. 1.
Figure 5:
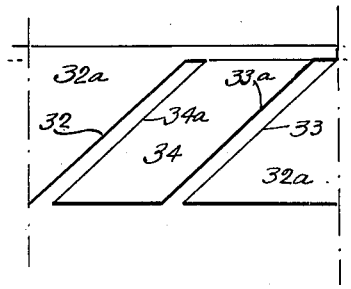
Fig. 5 is a diagrammatic illustration of the helical cams shown in the other figures.
Figure 6:
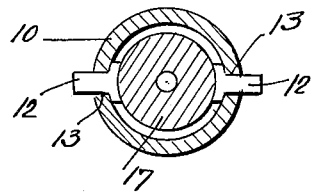
Fig. 6 is a horizontal cross-section on line 6—6 of Fig. 1.

As I have indicated above, the expansion of the cutters in this underreamer is by virtue of relative rotation between two parts of the reamer, those two parts or members being typically the body and an inner mandrel. Although expansion of the cutters by virtue of such relative rotation may be attained in other ways, in my invention I attain it by having the body and mandrel movable longitudinally with reference to each other, causing such relative longitudinal movement by virtue of the relative rotation. This arrangement enables me, as will be seen, to obtain a positive expansion of the cutters by reason of relative rotation in one direction (the direction of the rotary drive) and at the same time to cause contraction of the cutters by reason of the free vertical fall of one of said members with relation to the other. By making these provisions it is not necessary to reverse the direction of rotation to contract the cutters, the cutters being allowed to contract merely by virtue of fall of one member under its own weight, or under the downward pressure exerted by the casing shoe.

Typically, an underreamer constructed in accordance with my invention may have a hollow exterior body 10, preferably tubular in form; and an interior mandrel 11 which is both rotatable and movable longitudinally with reference to the body. The mandrel, at its upper end, is equipped with any usual connective means 11[a] to connect up with the drill stem or pipe; and the mandrel is thus, through the medium of that drill stem, moved vertically and rotated in a right hand direction (looking down on the mandrel). A cutter or cutters in any suitable number, as indicated at 12, may be mounted in slots 13 in body 10, the cutters projecting outside the body when in expanded condition. They may also project somewhat outside the body when in contracted position, as shown in Fig. 1. Although the details of the cutters and their co-operation with the mandrel are not necessary restrictions upon the present invention, I show a typical inter-engaging formation of the cutters and mandrel. The mandrel has a part 15 which may be designated as being full-sized, and directly below that it has a part 16 of reduced diameter; then next below it has a part 17 again of full size, and below that a part 18 again of reduced diameter. The inner vertical edges of the cutters are provided with recesses 19 which bridge, so to speak, the full-sized mandrel part 17 when the parts are in the position shown in Fig. 1 and the cutters are contracted. By relative downward motion of the mandrel in the body, or relative upward motion of the body and cutters on the mandrel, the parts reach the relative position shown in Fig. 2. The mandrel is provided with inclined shoulders 15ª and 17ª, and the cutters are also provided with corresponding inclined surfaces 20 and 21, the interengagement of these surfaces in the position of Fig. 1 causing the cutters to be forced outwardly to the position of Fig. 2 as the mandrel and body move to the position of Fig. 2, and when the parts are in the position of Fig. 2 the inner edges of the cutters bear back solidly against the full-sized parts 15 and 17 of the mandrel, the cutters being thus solidly held out in their expanded positions. Shoulders 22 and 23 at the upper and lower ends of the cutters bear outwardly against the wall of the body and limit the outward movements of the cutters.

The cutter and mandrel formation and interengagement that I have described are not my invention, but are described as a typical and practical form of cutter and mandrel interengagement which will cause expansion of cutters by reason of relative upward motion of the body on the mandrel, and allow the cutters to collapse by reason of relative downward motion of the body on the mandrel.

Before going to a particular description of the cam means which translates relative rotation into relative longitudinal movement, I shall describe other features of the underreamer, which features may be varied and modified without departing from my invention. The underreamer body may be so constituted as to take a drill bit 25 at its lower end. For instance, this drill bit may be joined at its upper end with a body extension 26, which may be screw-threaded at 27 into a lower end of the tubular body 10. The lower reduced portion 18 of the mandrel may extend through a bore 28 in the upper end of body extension 26, and the upper end of this extension 26 may constitute a stop, or one of the stop means, to limit the relative downward movement of the mandrel in the body. This will be understood from an inspection of Fig. 2. Likewise, if desired, the enlarged wrench head 29 at the upper end of the mandrel may constitute a similar stop means by coming down on the upper end of the body.

To limit upward motion of the mandrel in the body the lower end of the mandrel may have a nut or nuts 30 which come up against an annular shoulder 31 in body extension 26. And additionally there may be other stop means for such relative forward motion of the mandrel embodied in the cam means, which will be hereinafter described. The general function of these stops to longitudinal movement is, in addition to preventing the body and mandrel falling apart longitudinally, to limit such relative longitudinal movement to the range of inter-engagement of the helical cam means, so that such means is always held in inter-engaging relation.

A typical and simple form of cam means for translating the relative rotary motion into relative longitudinal motion is shown in the drawings. At the upper end of the body there may be bushing 35 screw-threaded into the body and through which the mandrel passes vertically. This bushing may carry, depending from its lower end, a cam member 32ª which has two helical cam faces 32 and 33. Although the angle of these helical cam faces may be varied between limits indicated below, I have adopted an angle of about 45° as being suitable to the purposes. Between these two helical cam faces there plays a cam lug 34 which also has two helical cam faces 34ª and 33ª engageable, respectively, with cam faces 32 and 33. The lug 34 preferably plays loosely between the cam faces 32 and 33, so that a certain amount of rotative lost motion is allowed before the cam faces come into actual engagement to cause relative vertical movement. Cam lug 34 is rigidly mounted in some suitable manner upon mandrel 11. For instance, it may be formed integrally therewith. Cam member 32ª may be formed integrally with bushing 35 which is rigidly connected with body 10. Consequently any relative rotation between the body and mandrel will, by virtue of the cam action, cause relative longitudinal movement between the body and mandrel. Engagement of the upper end of cam lug 34, with the downwardly facing shoulder 32ᵇ gives a stop, in addition to those before noted, to the relative downward movement of the body on the mandrel.

With the parts in the position shown in Fig. 1, the reamer may be lowered through a well casing, the cutters being contracted. Upon passing below the lower end of the casing and coming to the location where the drilling work is to be performed, the drill stem attached to the mandrel is rotated in a right-hand direction. Drill bit 25, resting upon the bottom of the hole, will, by its cutting resistance, or the cutters 12 engaging the sides of the hole will by their cutting resistance, tend to hold the body stationary as regards rotation. After the lost motion in the cam means is taken up the cam face 34ª will be brought up against cam face 32 and the interaction of these two cam faces will then force the body and the cutters upwardly with relation to the mandrel, and will thus cause expansion of cutters 12. The parts will then be in the relative position shown in Fig. 2.

In this position the upper end of cam lug 34 has not passed below the lower end of cam 32ª so that the upper part of cam surface 34ª will remain in contact with cam surface 32; and as long as rotation is continued the body will, by virtue of that rotation and by virtue of the rotational resistance of the cutters, be held up on the mandrel and the cutters will be held in their expanded position. This holding of the cutters positively in their expanded positions, by virtue of rotation, will be true whether the cutters have been initially expanded by virtue of relative rotation, or initially expanded merely by virtue of relative longitudinal movement. For instance, and this is one of the features of my invention, if the tool is lowered to rest upon the bottom of a well, and the mandrel thereafter lowered until it reaches the position of Fig. 2, the parts will reach their expanded position without the mandrel having been rotated positively from above. The angle of the cam faces allow this to take place freely; and then, upon rotation, the cam faces keep the parts in the relative position shown in Fig. 2.

Likewise the selected angle of the cam faces allows the body to drop freely with relation to the mandrel, so that when rotation has ceased and the tool is pulled up through the well, the body immediately drops with relation to the mandrel and the parts are carried back to the position of Fig. 1. If for any reason whatever the parts have become stuck so that they will not move freely under the weight of the body, the expanded cutters 12 will come into contact with the lower end of the casing or the casing shoe and as the mandrel is hoisted upwardly the body will momentarily be held stationary, being thus forced down on the mandrel until the collapsed position of Fig. 1 is reached.

It is a feature of my device that the angles of the cam faces are such as to allow the above described operations; in other words the helix angle of these cam faces is small enough with reference to the axis of the mandrel, that those faces shall not be "self binding" in their inter-engagement. If the helix pitch were as short as the pitch of an ordinary screw-thread, for instance, it will readily be seen that the actions herein described would not take place, as the body would not be free to move longitudinally with relation to the mandrel. On the other hand it is desirable not to make the helix pitch too long, as a very flat helical engagement of the cam faces would make the faces self binding as regards the transformation of relative rotation into relative longitudinal movement. Between the limits imposed by these conditions the helical angles may be selected and fixed as desired; but for practical operative purposes an angle of about 45° is found effective, that angle giving great freedom of relative vertical movement to the body and at the same time being very effective in translating relative rotation into relative vertical motion.

I claim:

1. A rotary cutting tool, embodying two members movable vertically and rotatively relative to each other, a radially movable cutter mounted in one member, the cutter and the other member having interengaging formations that cause outward movement of the cutter by virtue of relative upward movement of the cutter carrying member and its cutter, helical means actuated by virtue of relative rotation between the members to move the cutter carrying member upwardly with relation to the other member, the pitch angle of said helical means is such that the cutter carrying member being free to move downwardly under its own weight unrestrained by said helical means.

2. A rotary cutting tool, embodying two members movable vertically and rotatively relative to each other, a radially movable cutter mounted in one member, the cutter and the other member having interengaging formations that cause outward movement of the cutter by virtue of relative upward movement of the cutter carrying member and its cutter, means actuated by virtue of relative rotation between the members to move the cutter carrying member upwardly with relation to the other member, said means embodying an interengaging pair of helical elements whose angle of engagement is such that the cutter carrying member when unrestrained may drop freely with reference to the other member.

3. A rotary cutting tool, embodying two members movable vertically and rotatively relative to each other, a radially movable cutter mounted in one member, the cutter and the other member having interengaging formations that cause outward movement of the cutter by virtue of relative upward movement of the cutter carrying member and its cutter, means actuated by virtue of relative rotation between the members to move the cutter carrying member upwardly with relation to the other member, said means embodying an interengaging pair of helical elements whose angle of engagement is such that the cutter carrying member when unrestrained may drop freely with reference to the other member, rotational stop means embodied in the helical elements limiting the relative rotation, and other stop means limiting the relative vertical movement to keep the helical elements in engagement.

4. A rotary cutting tool, embodying two members movable vertically and rotatively relative to each other, a radilly movable cutter mounted in one member, the cutter and the other member having interengaging formations that cause outward movement of the cutter by virtue of relative upward movement of the cutter carrying member and its cutter, means actuated by virtue of relative rotation between the members to move the cutter carrying member upwardly with relation to the other member, said means embodying an interengaging air of of helical elements whose angle of engagement is such that the cutter carrying member when unrestrained may drop freely with reference to the other member, and stop means limiting the relative vertical movement between the two members to less than that capable of being caused by the helical elements so as to keep said elements constantly in engagement.

5. A rotary underreamer, comprising a vertical mandrel, a hollow body surrounding the mandrel, the mandrel and body being movable vertically and rotatively with reference to each other and the body being free to drop on the mandrel under its own weight, a cutter carried by the body and radially movable therein, the cutter and mandrel having interengaging formations that cause outward movement of the cutter by virtue of upward movement of the body and cutter on the mandrel, and means actuated by relative rotation of the mandrel and body to cause relative upward movement of the body on the mandrel, said means including a pair of interengaging helical elements one on the body and the other on the mandrel and whose angle of engagement is such as not to restrain relative downward movement of the body.

6. A rotary underreamer, comprising a vertical mandrel, a hollow body surrounding the mandrel, the mandrel and body being movable vertically and rotatively with reference to each other and the body being free to drop on the mandrel under its own weight, a cutter carried by the body and radially movable therein, the cutter and mandrel having interengaging formations that cause outward movement of the cutter by virtue of upward movement of the body and cutter on the mandrel, and means actuated by relative rotation of the mandrel and body to cause relative upward movement of the body on the mandrel, said means including a pair of interengaging helical elements one on the body and the other on the mandrel and whose angle of engagement is such as not to restrain relative downward movement of the body, and stops to limit the relative vertical movements of the mandrel and body within the range of interengagement of the helical elements.

7. A rotary cutting tool, embodying an internal cutter expanding mandrel, an exterior cutter mounted to be movable radially, rotatively and longitudinally with relation to the mandrel, the cutter and mandrel having inter-engaging formations that cause outward movement of the cutter by virtue of relative upward movement of the cutter with relation to the mandrel, helical means actuated by virtue of relative rotation between the mandrel and cutter to move the cutter upwardly with relation to the mandrel, the pitch angle of said helical means being such that the cutter is free to move downwardly unrestrained by said helical means.

In witness that I claim the foregoing I have hereunto subscribed my name.

LAWRENCE CAMPBELL.

CERTIFICATE OF CORRECTION.

Patent No. 1,743,528.　　　　　　　　　　　Granted January 14, 1930, to

LAWRENCE CAMPBELL.

It is hereby certified that error appears in the printed specification of the above numbered patent requiring correction as follows: Page 3, line 80, claim 1, for the word "is" read "being", and line 81, for the word "being" read "is"; line 125, claim 4, for the misspelled word "radilly" read "radially"; page 4, line 5, claim 4, strike out the words "air of" and insert instead "pair"; and that the said Letters Patent should be read with these corrections therein that the same may conform to the record of the case in the Patent Office.

Signed and sealed this 11th day of March, A. D. 1930.

(Seal)　　　　　　　　　　　　　　　　　　　M. J. Moore,
　　　　　　　　　　　　　　　　　　Acting Commissioner of Patents.